United States Patent Office 3,103,511
Patented Sept. 10, 1963

3,103,511
DERIVATIVES OF 3,4-DIHYDRO-1,2,4-PYRIDO
[2,3-e] THIADIAZINE-7-SULFONAMIDE - 1,1-
DIOXIDE
Jack Bernstein and Harry Louis Yale, New Brunswick,
N.J., assignors to Olin Mathieson Chemical Corporation, New York, N.Y., a corporation of Virginia
No Drawing. Filed Dec. 29, 1958, Ser. No. 783,110
3 Claims. (Cl. 260—243)

This invention relates to new chemical compounds, and more particularly to new dihydropyridothiadiazine-1,1-dioxides of the formula:

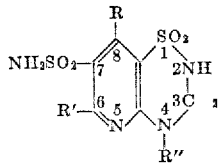

as well as the alkali metal salts thereof, wherein R and R' are hydrogen, halogen, trihalomethyl, lower alkyl, or lower alkoxy, and R" is hydrogen or lower alkyl.

The new dihydropyridothiadiazine-1,1-dioxides of this invention are physiologically active compounds which possess both diuretic and anti-hypertensive activities. Thus, these compounds are administrable parenterally and (preferably) orally in the treatment of congestive heart failure, being uniquely suitable for this and other conditions where both the diuretic and anti-hypertensive activities are desirable. Moreover, surprisingly it has been found that the compounds of this invention are many times more active than the corresponding unreduced pyridothiadiazine derivatives disclosed in application Serial No. 730,767, filed April 25, 1958, U.S. Patent No. 3,063,995.

The compounds of this invention are prepared by the process of this invention which essentially comprises reacting a compound of the general formula

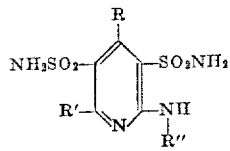

wherein R, R', and R" are as hereinbefore defined, with a compound of the formula $CH_2X_2$, wherein X is halo (e.g. bromo and chloro), lower alkoxy (e.g. methoxy or ethoxy), or the X's together is keto (oxo), at an elevated temperature, and recovering the product formed. If formaldehyde is used it may be supplied as such but preferably is in a commercially utilizable form such as an aqueous solution (e.g. formalin) or a polymeric state (e.g. trioxane and paraformaldehyde). In the case of a polymeric form of formaldehyde or an acetal of formaldehyde (e.g. methylal and diethoxymethane), the reaction is preferably conducted in the presence of an acid catalyst, such as dilute aqueous hydrochloric, phosphoric, p-toluene sulfonic, trichloroacetic, or sulfuric acid. In the case of methylene dihalide (e.g. methylene dibromide), the reaction is preferably conducted under basic conditions followed by neutralization with an acid. The free dihydropyridothiadiazine dioxide thus formed can then, if desired, be treated with alcoholic alkali metal hydroxide (e.g. potassium hydroxide), whereby the alkali metal salts are formed.

The 2-aminopyridine-3,5-disulfonamide reactants can be prepared as disclosed in said application, Serial No. 730,767, and specifically include 2-aminopyridine-3,5-disulfonamide, 2-amino-4-halopyridine-3,5-disulfonamides (e.g. 2-amino-4-chloropyridine - 3,5 - disulfonamide), 2-amino-6-halopyridine-3,5-disulfonamides (e.g. 2-amino-6-chloropyridine-3,5-disulfonamide), 2 - amino-4,6-dihalopyridine-3,5-disulfonamides (e.g. 2-amino-4,6-dichloropyridine-3,5-disulfonamide), 2-amino - 4 - trihalomethylpyridine-3,5-disulfonamides (e.g. 2-amino-4-trifluoromethylpyridine-3,5-disulfonamide), 2-amino-6-trihalomethylpyridine-3,5-disulfonamides (e.g. 2-amino-6-trifluoromethylpyridine-3,5-disulfonamide), 2-amino-4-(lower alkyl) pyridine-3,5-disulfonamides (e.g. 2 - amino-4-picoline-3,5-disulfonamide and 2-amino - 4 - ethylpyridine-3,5-disulfonamide), 2-amino-6-(lower alkyl)pyridine - 3,5 - disulfonamides (e.g. 2-amino-6-picoline-3,5-disulfonamide and 2-amino-6-n-butylpyridine-3,5-disulfonamide), 2-amino-4-6-di(lower alkyl) pyridine-3,5-disulfonamides (e.g. 2-amino-4,6 - dimethylpyridine-3,5-disulfonamide and 2-amino-6-ethyl - 4 - picoline-3,5-disulfonamide), 2-amino-4-(lower alkoxy)-pyridine - 3,5 - disulfonamides (e.g. 2-amino-4-methoxypyridine-3,5-disulfonamide), 2 - amino-6-(lower alkoxy)pyridine-3,5-disulfonamides, 2-amino-4,6-di(lower alkoxy)pyridine - 3,5 - disulfonamides, 2-amino-4-(lower alkyl)-6-(lower alkoxy)pyridine-3,5-disulfonamides (e.g. 2-amino-6-ethoxy-4-picoline-3,5-disulfonamide), 2-(lower alkyl) aminopyridine-3,5-disulfonamides (e.g. 2-methyl-aminopyridine-3,5-disulfonamide), and 2-(lower alkyl)-amino derivatives of the substituted pyridines listed hereinbefore.

These reactants yield the following final products, respectively: 3,4 - dihydro-1,2,4-pyrido[2,3-e]thiadiazine-7-sulfonamide-1,1-dioxide, 8-halo-3,4-dihydro-1,2,4-pyrido-[2,3-e]thiadiazine-7-sulfonamide-1,1-dioxides, 6-halo-3,4-dihydro-1,2,4-pyrido[2,3-e]thiadiazine - 7 - sulfonamide-1,1 - dioxides, 6,8-dihalo-3,4-dihydro-1,2,4-pyrido[2,3-e]-thiadiazine-7-sulfonamide-1,1-dioxides, 8 - trihalomethyl-3,4-dihydro-1,2,4-pyrido[2,3-e]thiadiazine-7-sulfonamide-1,1-dioxides, 6-trihalomethyl - 3,4 - dihydro-1,2,4-pyrido-[2,3-e]thiadiazine-7-sulfonamide-1,1-dioxides, 8 - (lower alkyl) - 3,4-dihydro-1,2,4-pyrido[2,3-e]thiadiazine-7-sulfonamide-1,1-dioxides, 6-(lower alkyl)-3,4-dihydro-1,2,4-pyrido[2,3-e]thiadiazine-7-sulfonamide-1,1-dioxides, 6,8-di(lower alkyl) - 3,4-dihydro-1,2,4-pyrido[2,3-e]thiadiazine-7-sulfonamide-1,1-dioxides, 8-(lower alkoxy)-3,4-dihydro - 1,2,4-pyrido[2,3-e]thiadiazine-7-sulfonamide-1,1-dioxides, 6-(lower alkoxy)-3,4-dihydro-1,2,4-pyrido[2,3-e]thiadiazine-7-sulfonamide-1,1-dioxides, 6,8-di(lower alkoxy) - 3,4 - dihydro-1,2,4-pyrido[2,3-e]thiadiazine-7-sulfonamide-1,1-dioxides, 6-(lower alkoxy)-8-(lower alkyl)-3,4-dihydro-1,2,4-pyrido[2,3-e]thiadiazine-7-sulfonamide-1,1-dioxides, 4-(lower alkyl)-3,4-dihydro-1,2,4-pyrido[2,3-e]thiadiazine-7-sulfonamide-1,1-dioxides, and the 4-(lower alkyl) derivatives of the substituted pyridothiadiazines listed hereinbefore.

The following examples illustrate the invention (all temperatures being in centigrade):

EXAMPLE 1

*6-Methyl-3,4-Dihydro-1,2,4-Pyrido[2,3-e]Thiadiazine-7-Sulfonamide 1,1-Dioxide*

A mixture of 26.6 g. of 2-amino-6-methylpyridine-3,5-disulfonamide and 8 g. of a 37% aqueous formaldehyde solution (formalin) in 500 ml. of 95% ethanol is refluxed for three hours. The solution is then concentrated under reduced pressure to yield the desired 3,4-dihydro-6-methyl - 1,2,4 - pyrido[2,3 - e] - thiadiazine - 7 - sulfonamide-1,1-dioxide. The product may be purified by crystalization from water or aqueous alcohol.

EXAMPLE 2

The procedure of Example 1 is followed except for the substitution of 3 g. of paraformaldehyde for the formalin solution and 5 cc. of 10% aqueous hydrochloric acid is added. The same product is isolated by neutralization of the hydrochloric acid with aqueous sodium hydroxide and concentration of the reaction mixture.

EXAMPLE 3

The procedure of Example 1 is followed except that 3 g. of trioxane is substiuted for the formalin solution and 0.1 g. of p-toluene sulfonic acid is added. The same product is formed.

EXAMPLE 4

A mixture of 67 grams of 2-amino-6-methyl-pyridine-3,5-disulfonamide, 43.5 g. of methylene bromide, 39.5 grams of anhydrous potassium carbonate and 250 ml. of dimethylformamide is stirred at 100° for three hours. The mixture is then treated with a solution of 16 g. of 85% potassium hydroxide in 20 ml. of water and heated for an additional hour at 100°. The reaction mixture is then concentrated in vacuo from the steam bath and the residue dispersed in 500 ml. of water. The mixture is then neutralized with dilute hydrochloric acid, warmed for about an hour on a steam bath and then cooled to give the desired 6-methyl-3,4-dihydro-1,2,4-pyrido[2,3-e]-thiadiazine-7-sulfonamide 1,1-dioxide.

EXAMPLE 5

*6-Chloro-3,4-Dihydro-1,2,4-Pyrido[2,3-e]Thiadiazine-7-Sulfonamide 1,1-Dioxide*

By using 28.7 g. of 2-amino-6-chloropyridine-3,5-disulfonamide in Example 1 instead of the 2-amino-6-methylpyridine-3,5-disulfonamide, there is obtained 6-chloro - 3,4 - dihydro - 1,2,4 - pyrido[2,3-e]thiadiazine-7-sulfonamide 1,1-dioxide.

EXAMPLE 6

*3,4-Dihydro-1,2,4-Pyrido[2,3-e]Thiadiazine-7-Sulfonamide 1,1-Dioxide*

A mixture of 25.2 g. of 2-aminopyridine-3,5-disulfonamide and 8 g. of a 37% aqueous solution of formaldehyde (formalin) in 500 ml. of 90% isopropanol is refluxed for two hours. The solution is then concentrated to dryness to yield the desired 3,4-dihydro-1,2,4-pyrido[2,3-e]thiadiazine-7-sulfonamide 1,1-dioxide.

EXAMPLE 7

*Potassium Salt of 3,4-Dihydro-1,2,4-Pyrido[2,3-e]Thiadiazine-7-Sulfonamide-1,1-Dioxide*

To a solution of 1.32 g. of 85% potassium hydroxide in 100 ml. of 95% ethanol is added gradually with shaking 2.62 g. of 3,4-dihydro-1,2,4-pyrido[2,3-e]thiadiazine-7-sulfonamide-1,1-dioxide. The solid dissolves. The resulting alcoholic solution is concentrated in vacuo to yield the dipotassium salt as a free flowing granular powder.

Similarly, using the equivalent quantity of sodium hydroxide instead of potassium hydroxide, the disodium salt is obtained.

EXAMPLE 8

*4-Methyl-3,4-Dihydro-1,2,4-Pyrido[2,3-e]Thiadiazine-7-Sulfonamide 1,1-Dioxide*

A mixture of 2.66 g. (0.01 M) 2-methylamino-3,5-pyridinedisulfonamide and 1 g. of 37% aqueous formaldehyde solution in 50 ml. of 95% ethanol is refluxed for 3 hours. The reaction mixture is concentrated under reduced pressure to yield the product. The product can be purified by recrystallization from water.

The invention may be variously otherwise embodied within the scope of the appended claims.

What is claimed is:

1. A compound selected from the group consisting of dihydropyridothiadiazine-1,1-dioxides of the formula

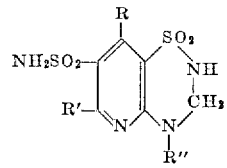

and alkali metal salts thereof, wherein R is selected from the group consisting of hydrogen, halogen, trihalomethyl, lower alkyl and lower alkoxy, R' is trihalomethyl and R" is selected from the group consisting of hydrogen and lower alkyl.

2. 8-trihalomethyl - 3,4 - dihydro - 1,2,4 - pyrido[2,3-e]thiazine-7-sulfonamide-1,1-dioxide.

3. 6-trihalomethyl - 3,4 - dihydro - 1,2,4 - pyrido[2,3-e]thiadiazine-7-sulfonamide-1,1-dioxide.

References Cited in the file of this patent

UNITED STATES PATENTS 2,809,194    Novello _____ Oct. 8, 1957

FOREIGN PATENTS 557,149    Belgium _____ Nov. 4, 1957

OTHER REFERENCES

Freeman et al.: J. Org. Chem., volume 16, pages 818, 821, 835 (1951).

Hermann et al.: Texas State J. of Medicine (December 1958), pages 854–858.

UNITED STATES PATENT OFFICE
CERTIFICATE OF CORRECTION

Patent No. 3,103,511            September 10, 1963

Jack Bernstein et al.

It is hereby certified that error appears in the above numbered patent requiring correction and that the said Letters Patent should read as corrected below.

Column 1, lines 14 to 20, the formula should appear as shown below instead of as in the patent:

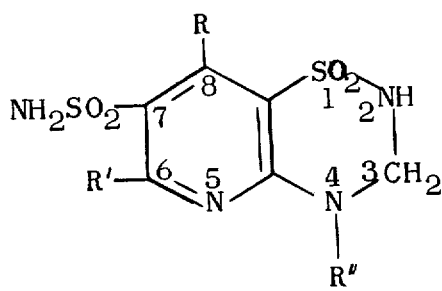

column 3, line 7, for "substiuted" read -- substituted --;
column 4, line 36, for "e]thiazine-" read -- e]thiadiazine- --.

Signed and sealed this 5th day of May 1964.

(SEAL)
Attest:

ERNEST W. SWIDER
Attesting Officer

EDWARD J. BRENNER
Commissioner of Patents